United States Patent
Ikeda

(10) Patent No.: US 8,140,710 B2
(45) Date of Patent: Mar. 20, 2012

(54) HOME LINK SETTING METHOD, HOME GATEWAY DEVICE, AND MOBILE TERMINAL

(75) Inventor: Shinkichi Ikeda, Yokohama (JP)

(73) Assignee: Panasonic Corporation, Osaka (JP)

( * ) Notice: Subject to any disclaimer, the term of this patent is extended or adjusted under 35 U.S.C. 154(b) by 398 days.

(21) Appl. No.: 10/551,795

(22) PCT Filed: Oct. 18, 2004

(86) PCT No.: PCT/JP2004/015749
§ 371 (c)(1),
(2), (4) Date: Sep. 27, 2005

(87) PCT Pub. No.: WO2005/039125
PCT Pub. Date: Apr. 28, 2005

(65) Prior Publication Data
US 2006/0184692 A1 Aug. 17, 2006

(30) Foreign Application Priority Data

Oct. 17, 2003 (JP) ................................ 2003-357724
Oct. 13, 2004 (JP) ................................ 2004-298721

(51) Int. Cl.
*G06F 15/16* (2006.01)
*G06F 15/173* (2006.01)
*H04W 4/00* (2009.01)
*H04W 40/00* (2009.01)

(52) U.S. Cl. ........ 709/250; 709/205; 709/224; 709/227; 370/338; 455/445

(58) Field of Classification Search .................. 370/338; 455/445; 709/250, 227, 205, 224
See application file for complete search history.

(56) References Cited

U.S. PATENT DOCUMENTS

| | | | |
|---|---|---|---|
| 5,572,528 A * | 11/1996 | Shuen ............................ | 370/402 |
| 5,848,069 A * | 12/1998 | Milne et al. .................... | 370/426 |
| 6,160,999 A * | 12/2000 | Chheda et al. .................. | 455/69 |
| 6,334,145 B1 * | 12/2001 | Adams et al. .................. | 709/217 |
| 6,411,705 B2 * | 6/2002 | Oran et al. ..................... | 379/230 |
| 6,430,698 B1 * | 8/2002 | Khalil et al. .................... | 714/4 |

(Continued)

FOREIGN PATENT DOCUMENTS

JP 2001-24710 A 1/2001

(Continued)

OTHER PUBLICATIONS

O. Troan et al., "IPv6 Prefix Options for DHCPv6", draft-ietf-dhc-dhcpv6-opt-prefix-delegation-03.txt, Mar. 3, 2003.

(Continued)

*Primary Examiner* — Kenny S Lin
*Assistant Examiner* — Guang Li
(74) *Attorney, Agent, or Firm* — RatnerPrestia

(57) ABSTRACT

A home gateway device having a home agent function selects communication interfaces other than the communication interface which has acquired network information for setting a home network to be home links, and appropriately sets the home link and a home agent by using the acquired network information, thereby reliably achieving the automatization of the device setting. Moreover, the home gateway device selects a link connected to a mobile terminal based on a mobile IP as home link, acquires existing home agent information from the mobile terminal and makes settings with this information, thereby setting the home link without compelling the mobile terminal to change its setting.

13 Claims, 14 Drawing Sheets

U.S. PATENT DOCUMENTS

| | | | |
|---|---|---|---|
| 6,466,964 B1 * | 10/2002 | Leung et al. | 709/202 |
| 6,765,900 B2 * | 7/2004 | Peirce et al. | 370/351 |
| 6,856,624 B2 * | 2/2005 | Magret | 370/392 |
| 6,954,790 B2 * | 10/2005 | Forslow | 709/227 |
| 6,965,567 B2 * | 11/2005 | Ramos et al. | 370/235 |
| 7,130,398 B2 * | 10/2006 | Yi | 379/114.07 |
| 7,328,014 B2 * | 2/2008 | Takeda et al. | 455/435.1 |
| 7,340,517 B2 * | 3/2008 | Matsuoka | 709/224 |
| 2002/0009073 A1 * | 1/2002 | Furukawa et al. | 370/352 |
| 2002/0031108 A1 * | 3/2002 | Inoue | 370/338 |
| 2002/0080752 A1 * | 6/2002 | Johansson et al. | 370/338 |
| 2002/0124107 A1 * | 9/2002 | Goodwin | 709/242 |
| 2002/0133595 A1 * | 9/2002 | Kimura et al. | 709/227 |
| 2002/0191562 A1 * | 12/2002 | Kumaki et al. | 370/331 |
| 2002/0194361 A1 * | 12/2002 | Itoh et al. | 709/233 |
| 2003/0022619 A1 * | 1/2003 | Karino et al. | 455/3.01 |
| 2003/0043773 A1 * | 3/2003 | Chang | 370/338 |
| 2003/0069018 A1 * | 4/2003 | Matta et al. | 455/436 |
| 2004/0158639 A1 * | 8/2004 | Takusagawa et al. | 709/229 |

FOREIGN PATENT DOCUMENTS

| | | |
|---|---|---|
| JP | 2001-94599 A | 4/2001 |
| JP | 2002-9808 A | 1/2002 |
| JP | 2002-290437 | 10/2002 |
| JP | 2004-104703 | 4/2004 |

OTHER PUBLICATIONS

International Search Report corresponding to International Application No. PCT/JP2004/015749, dated Oct. 18, 2004.

* cited by examiner

FIG.5

| LINK ID | IP ADDRESS | LINK LAYER ADDRESS | LINK CLASS |
|---|---|---|---|
| 51 | IPAddr_A | L2Addr_A | ISP |
| 52 | IPAddr_B | L2Addr_B | Home |
| 53 | IPAddr_C | L2Addr_C | Home |

HOME LINK SETTING METHOD, HOME GATEWAY DEVICE, AND MOBILE TERMINAL

This application is a U.S. National Phase Application of PCT International Application No. PCT/JP2004/015749, filed Oct. 18, 2004.

TECHNICAL FIELD

This invention relates to a home link setting method and a home gateway device which perform settings regarding a home agent for accommodating mobile terminals in a home gateway device which performs relay between a home network and the Internet and which is mainly installed at homes.

BACKGROUND ART

As one of migration managing methods in an Internet system, there is a Mobile IP, and Mobile IPv4 based on IPv4 is standardized in RFC 3220 (IP Mobility Support). The standardization of Mobile IPv6 based on IPv6 is currently proceeding as described in an Internet draft "draft-ietf-mobileip-ipv6 (Mobility Support in IPv6)". By means of these protocols, a mobile terminal can perform communications using the same address when the mobile terminal moves between different networks.

In Mobile Ipv6, when a mobile terminal moves away from a home link, the terminal acquires prefix information of the currently connected link from network information transmitted by an access router device of the currently connected link. The mobile terminal generates a care-of address which is temporarily used in the link, from the prefix information of the link. After that, the mobile terminal registers the care-of address in a home agent on the home link of the mobile terminal as a primary care-of address by transmitting a binding update message to a home agent. The home agent receives the binding update message from the mobile terminal, then, makes or updates a binding cache entry which relates a home address with the care-of address.

After that, the home agent refers to the binding cache and receives, on behalf of the mobile terminal, a packet transmitted to the home address of the mobile terminal at the home link. Then, the home agent executes a processing of encapsulating the packet received on behalf of the terminal and forwarding it to the care-of address of the mobile terminal. The mobile terminal decapsulates the tunneled packet forwarded by the home agent, and thus can receive the packet addressed to the home address of the mobile terminal.

Providing the home agent function of mobility management to the mobile terminal in the home gateway device controlling relay processing between the home network and the Internet network as above has been considered to be preferable in view of forwarding efficiency compared with arrangement of the home agent in the home network, because the redirection can be achieved without forwarding the packet destined to the mobile terminal to the home network while the mobile terminal is accommodated in an foreign network.

One of methods of providing the home gateway device with IP addresses and information for setting the home network is using DHCP (Dynamic Host Configuration Protocol). DHCPv4 based on IPv4 is standardized in RFC 2131 (Dynamic Host Configuration Protocol), and is mainly used for providing terminals with IP addresses and information of servers allocated in the network. DHCPv6 based on IPv6 is disclosed in JP-A-2001-24710 and the standardization thereof is currently proceeding. By using the DHCPv6, network prefix information can be provided in addition to the functions provided by the DHCPv4. By having a DHCP server provide the home gateway device with prefix information for setting the home network, the home gateway device can construct the home network automatically. A method of distributing the network prefix information using the DHCPv6 is disclosed in an Internet draft "draft-ietf-dhc-dhcpv6-opt-prefix-delegation (IPv6 Prefix Options for DHCPv6)", and the standardization work is currently proceeding.

In addition to the Internet draft and the like, home conventional gateway devices include the one disclosed in JP-A-2001-24710.

FIG. 14 is a configuration view of a mobile communication system disclosed in JP-A-2001-24710.

In FIG. 14, when a local network 1200 is connected to a wide area network 1500, a representative server 1010 of the local network 1200 tries to make a connection to a segment 1120. At that time, the representative server 1010 requests that an upper server 1020 which manages the segment 1120 allocate an address block. The representative server distributes the address block allocated as a result of this request in the local network 1200. Accordingly, the representative server 1010 can make an automatic management of the addresses efficiently at appropriate timing.

However, in the Internet drafts "draft-ietf-dhc-dhcpv6 (Dynamic Host Configuration Protocol for IPv6) and "draft-ietf-dhc-dhcpv6-opt-prefix-delegation (IPv6 Prefix Options for DHCPv6)", the setting method of a home link, namely, a sequence of operations where network information for setting the home link is acquired when the device is activated, parameters of the home link and the home agent are set, and the home agent is activated to start accommodating the mobile terminal, is not prescribed. Thus, it is required for a user to conduct the parameter setting manually. Especially, in IPv6 systems, since an IP address is a long address of 128 bits, the manual setting of the above parameter takes considerable effort.

Additionally, in the JP-A-2001-24710, the representative server which corresponds to the home gateway device receives the allocation of the address block from the connecting network. In order to make the server operate as the home agent, it is necessary that information based on the mobile IP is manually set to a communication interface connected to the home link. Particularly in the case of replacing the home gateway device, if there are existing mobile terminals, it is required to maintain as much as possible the settings of the home link included in these terminals and not to compel change of mobile terminal settings.

Furthermore, it is preferable that the home link is arranged in the home network, and it is necessary in an automatic setting thereof to appropriately select the communication interface which should serve as the home link.

DISCLOSURE OF THE INVENTION

The invention solves the above problems of conventional systems, and allows home gateway device automatically set a home link and a home agent. Further, when a mobile terminal based on the mobile IP has a connecting link, the setting of the home link can be conducted without compelling the mobile terminal to change its setting.

To solve the above problem, in a home link setting method by a home gateway device having plural communication interfaces including the one connected to an access network of Internet service provider, and processing means for a home agent accommodating a mobile terminal, the invention includes a network information processing means receiving network information for setting a home network, an interface setting means performing a network setting for all communication interfaces based on the received network information, and a home agent setting means performing settings so as to operate a home agent with respect to the communication interface designated as a home link, in which the interface setting means selects the communication interface to be designated as the home link among communication interfaces other than that receiving the network information, notifies the home agent setting means of this choice, and conducts the setting of the home agent.

Accordingly, for example, a communication interface connected to an Internet service provider and inappropriate to be set as the home link is detected automatically, and an appropriate communication interface can be set as the home link. Further, the home agent is automatically set for the communication interface set as the home link, thereby automating the setting by a user when installing the device, and considerably reducing the installation work burden.

A home link setting method according to the first aspect of the invention is a home link setting method by a home gateway device having a home agent function accommodating a mobile terminal, including a step of receiving network information for setting a home network through an communication interface connected to an Internet network, a home link selection step from among links connected to the communication interfaces other than the communication interface which has received the network information, and a home agent setting step performing an internal setting so as to cause the terminal on the selected link to conduct the home agent function.

Consequently, the home gateway device selects the communication link connected to the home network as the home link, not the communication link connected to the ISP, and automatically conducts a setting. Therefore, the work burden of a user when installing the device can be considerably reduced.

In the home link setting method according to the second aspect of the invention, in the home link selecting step, a link to which a mobile terminal complying with a mobile IP protocol is connected is designated as the home link.

Consequently, the communication link which has been already set as the home link by the mobile terminal is selected as the home link; therefore, the home link can be constructed without changing the conventional network configuration.

The home link setting method according to the third aspect of the invention further comprises a step of acquiring home agent information stored in the mobile terminal connected to the link connecting to the communication interface, and in the home agent setting step, when the home agent information meets conditions specified by the network information, the internal setting is executed using the acquired home agent information, whereas when the home agent information does not meet the conditions, the internal setting is executed using home agent information generated based on the network information.

Consequently, the existing network configuration and setting parameter of the home link can continue to be used, and therefore the setting of the home gateway device can be executed smoothly without compelling the mobile terminal to perform the setting again.

The home link setting method according to the fourth aspect of the invention includes, in the home agent setting step, when the internal setting is executed using home agent information which is newly generated, notification of new home agent information is given to all terminals on the home link.

Consequently, the mobile terminal can always obtain the right setting and notify the home agent of its registration, and therefore, the loss of packets to be transmitted and received can be prevented.

The home link setting method according to the fifth aspect of the invention further comprises a step of acquiring information concerning a mobile router function stored in the mobile terminal, and when the mobile terminal performs the mobile router operation, a setting of the home agent corresponding to the mobile router is executed.

Consequently, a setting and a home agent processing for a mobile router are executed only when behind a terminal there still more terminals accommodated by a mobile router, and as a result, resources can be efficiently utilized. This is because traffic addressed to the mobile router dealt with by the home agent tends to increase according to the number of terminals routed behind the mobile terminal, as compared with the case where the mobile terminal is itself the final destination of packets; therefore, in the home agent for the mobile router, much more resources are consumed for a forwarding processing of packets between the home agent and the mobile router. Further, because a space for managing a mobile prefix of the mobile router becomes necessary in the binding cache, memory consumption also increases.

A home gateway device according to the sixth aspect of the invention comprises plural communication interfaces connected to an Internet network or a local link, a network information processing unit receiving network information for setting a home network through the communication interfaces, an interface setting unit selecting one of the links connecting to the communication interfaces other than the communication interface which has received the network information to be a home link, a home agent processing unit performing a home agent function with respect to terminals on the home link, and a home agent setting unit executing settings in the home agent processing unit so as to cause with respect to the terminal on the link designated as the home link by the interface setting unit to conduct the home agent function.

Consequently, the communication link connected to the home network is selected as the home link, not the communication link connected to an ISP, and an automatic setting can be executed. Therefore, the work burden on a user when installing the device can be considerably reduced.

In the home gateway device according to the seventh aspect of the invention, the interface setting unit transmits a verification message for verifying the existence of the mobile terminal complying with a mobile IP, and designates the link connected to the communication interface which has received the message responding to the verification message notifying the existence of the mobile terminal, as the home link.

Consequently, the communication link which has been already set as the home link by the mobile terminal is selected as the home link, and therefore the home link can be constructed without changing the existing network configuration.

In the home gateway device according to the eighth aspect of the invention, the interface setting unit acquires home agent information stored in the mobile terminal connected to the home link, and when the home agent information meets conditions specified by the network information, the home agent setting unit performs a setting for a home agent function using the acquired home agent information. On the other hand, when the home agent information does not meet the conditions, the interface setting unit generates the home agent information based on the network information, and the home agent setting unit performs a setting of the home agent processing unit using the generated home agent information.

Consequently, the existing network configuration and setting parameter of the home link continue to be used, and as a result, the setting of the home gateway device can be executed smoothly without compelling the mobile terminal to perform the setting again.

In the home gateway device according to the ninth aspect of the invention, when the interface setting unit newly generates the home agent information, the home agent setting unit notifies all terminals on the home link of the new home agent information.

Consequently, in the case where the existing setting parameter of the home link cannot be used since the information is not consistent with the network information acquired from the ISP, notification of the change can be immediately given to the mobile terminal on the home link, and therefore the mobile terminal can always acquire the right setting and notifies the home agent of its registration. As a result, the loss of packets to be transmitted and received which are addressed to the mobile terminal can be prevented.

In the home gateway device according to the tenth aspect of the invention, the interface setting unit further acquires information concerning a mobile router function stored in the mobile terminal, and when the mobile terminal performs the mobile router operation, the home agent setting unit executes a setting corresponding to the mobile router in the home agent processing unit.

Consequently, a setting and a home agent processing for the mobile router are executed only when there is a mobile router which accommodates still more terminals behind the mobile terminal, and as a result resources can be efficiently utilized. This is because traffic addressed to the mobile router dealt with by the home agent tends to increase according to the number of terminals existing behind the mobile terminal as compared with the case where the mobile terminal itself is the final destination of packets. Therefore, in the home agent for the mobile router, much more resources are consumed for forwarding processing of packets between the home agent and the mobile router. Further, because a space for managing a mobile prefix of the mobile router becomes necessary in the binding cache, memory consumption also increases.

A mobile terminal according to the eleventh aspect of the invention comprises a mobile IP processing unit supporting a mobile IP protocol and receiving a verification message for verifying the existence of the mobile terminal connected on the link, and a home agent information response unit generating a response message in which stored home agent information is written upon receipt of notification of receipt of the verification message from the mobile IP processing unit, and the mobile IP processing unit transmits the response message to the transmission source device which transmitted the verification message.

In this way, the mobile terminal sends a response indicating its existence according to a request from the home gateway device, and therefore the connected communication link can be recognized as the home link and further, the home agent information set in the terminal itself can be used in the home gateway device. Then, accordingly, when the home gateway device is replaced, the mobile terminal is not required to change its setting information.

In the mobile terminal according to the twelfth aspect of the invention, the mobile IP processing unit further transmits a response message in which the state of its mobile router processing is written.

The mobile terminal notifying the home gateway device that it operates as a mobile router in this way makes it possible for the home gateway device to serve as the home agent for the mobile router, so that standard router processing can continue to be executed.

In the mobile terminal according to the thirteenth aspect of the invention, when the mobile IP processing unit does not support the mobile IP protocol, the home agent information response unit does not transmit the response message even if it receives the notification of receipt of the verification message from the mobile IP processing unit.

Consequently, the mobile terminal is not required to process a packet having no relation with itself, and its work burden can be reduced.

In the mobile terminal according to the fourteenth aspect of the invention, the mobile IP processing unit transmits the response message only when the mobile terminal is connected to its home agent.

Consequently, when the mobile terminal is connected to an foreign network, the home agent information is never transmitted even if it receives an inquiry as to whether it is connected or not, and as a result home agent information can be prevented from being transmitted to a person with evil intent.

As described above, according to the invention, the home gateway device can achieve automatization of setting of the home link and the home agent. Further, the setting of the home link can be executed without compelling mobile terminals on the selected home link to change its setting.

BRIEF DESCRIPTION OF THE DRAWINGS

FIG. 5 is a chart showing a link management table in the home gateway device according to the embodiment of the invention;

BEST MODE FOR CARRYING OUT THE INVENTION

Hereinafter, an embodiment of the invention will be explained with reference to the drawings.

Embodiment 1

Figure 3:
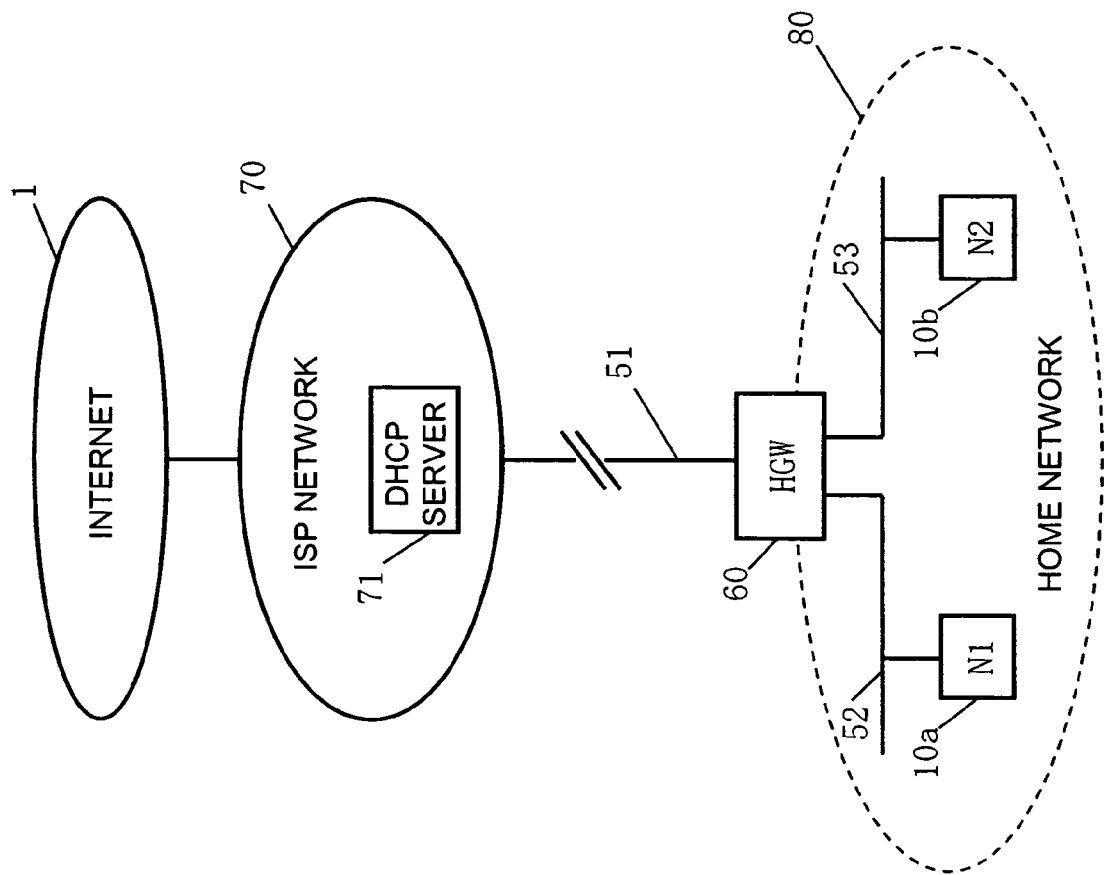
FIG. 3 is a view showing a configuration of a mobile communication system according to the embodiment of the invention.

FIG. 3 is a view showing a configuration of a mobile communication system including a home gateway device according to the invention.

In FIG. 3, a home gateway device 60 manages communication links 52 and 53, and a terminal (N1)10a and a terminal (N2)10b are connected to the communication links 52 and 53 respectively. The home gateway device 60, terminals 10a, 10b and the communication links 52, 53 compose a home network 80. The home gateway device 60 is connected to an Internet provider network (hereinafter, an ISP network) 70 through a communication link 51 and connected to Internet 1 through the ISP network 70. Note that a DHCP server 71 is installed in the ISP network 70. Terminals can be either a mobile terminal or a fixed terminal.

Next, an operation of the mobile communication system according to the embodiment will be explained.

The home gateway device 60 starts connecting to the ISP network 70 to communicate with Internet 1, and acquires network information for setting the home network 80 from the DHCP server 71 when power is activated or operation is reset. Then, the settings for the home network 80, more specifically for the communication links 52 and 53, are conducted based on the acquired network information.

Next, configurations of respective devices composing the above mobile communication system and operations thereof will be explained with reference to the drawings.

First, a configuration and a basic operation of the home gateway 60 will be explained.

Figure 1:
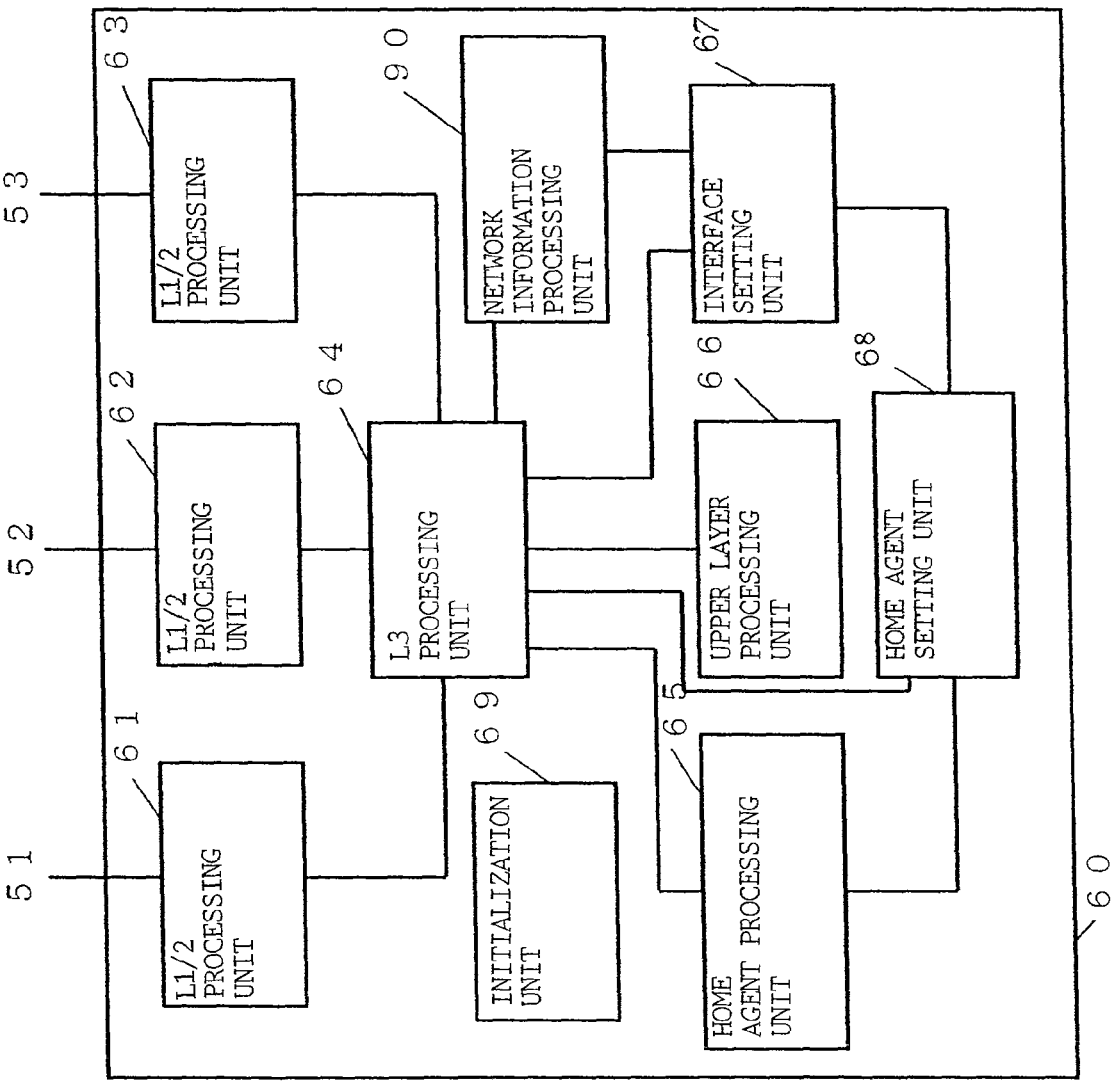
FIG. 1 is a diagram showing a configuration of a home gateway device according to an embodiment of the invention.

FIG. 1 is a configuration view of the home gateway device 60. L1/2 processing units 61 to 63 are connected to the communication links 51 to 53 respectively, performing a physical layer processing and a data link layer processing. The L1/2 processing units 61 to 63 correspond to the communication interfaces described in the invention.

An L3 processing unit 64 performs a network layer processing and a home agent processing unit 65 performs a home agent processing of a Mobile IP. An upper layer processing unit 66 processes protocols higher than the network layer. An interface setting unit 67 selects a home link from the plural communication links connected through the L1/2 processing units 61 to 63 and performs prescribed settings with respect to all links. A home agent setting unit 68 receives the designation of the home link by the interface setting unit 67 and executes a prescribed setting with respect to the home agent processing unit 65. In addition, an initialization unit 69 controls an initialization of the home gateway device 60. A network information processing unit 90 processes a DHCP protocol.

In FIG. 1, only three L1/2 processing units 61 to 63 connected to the communication links are shown, however, there may be a configuration having more L1/2 processing units, and the invention does not limit the number thereof. In the case of having four or more L1/2 units, the operation thereof can be achieved by a configuration or procedures similar to those explained as follows.

A basic operation of the home gateway device 60 as configured above will be explained as follows.

First, a packet exchange operation of the home gateway device 60 is as follows.

The L1/2 processing units 61 to 63 execute a physical layer protocol processing and a data link protocol processing to a packet received from the communication links 51 to 53. Then, the L3 processing unit 64 executes an IP protocol processing including a routing processing to the packet and then forwards the packet to one of the L1/2 processing units 61 to 63.

The L3 processing unit 64 transmits the corresponding network information as a router advertisement message 400 to all communication links connected through the L1/2 processing units 61 to 63 periodically or in accordance with the solicitation from outside.

Figure 8:
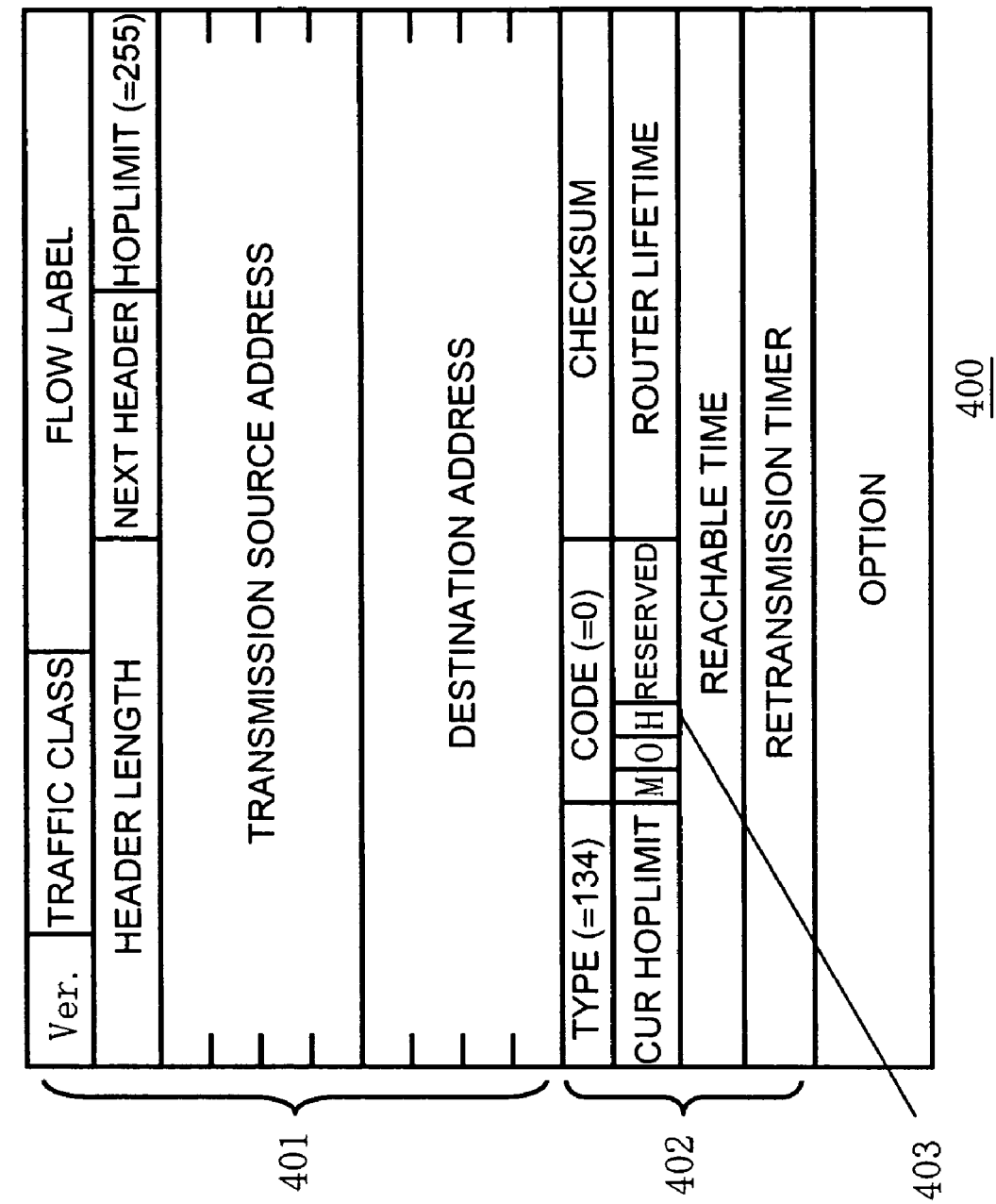
FIG. 8 is a chart showing a configuration of a router advertisement message according to the embodiment of the invention.

The router advertisement message 400 is based on "IETF RFC2461 (Neighbor Discovery for IPv6)", and a basic format thereof is shown in FIG. 8.

In FIG. 8, the router advertisement message 400 includes an IP header 401 and an ICMP router advertisement 402. Note that FIG. 8 shows nothing but the minimum format required in the invention, and message options other than the shown one can be added if required.

The upper layer processing unit 66 performs a prescribed processing, receiving the packet received and forwarded by the L3 processing unit 64 in the case of operating a firewall.

Figure 2:
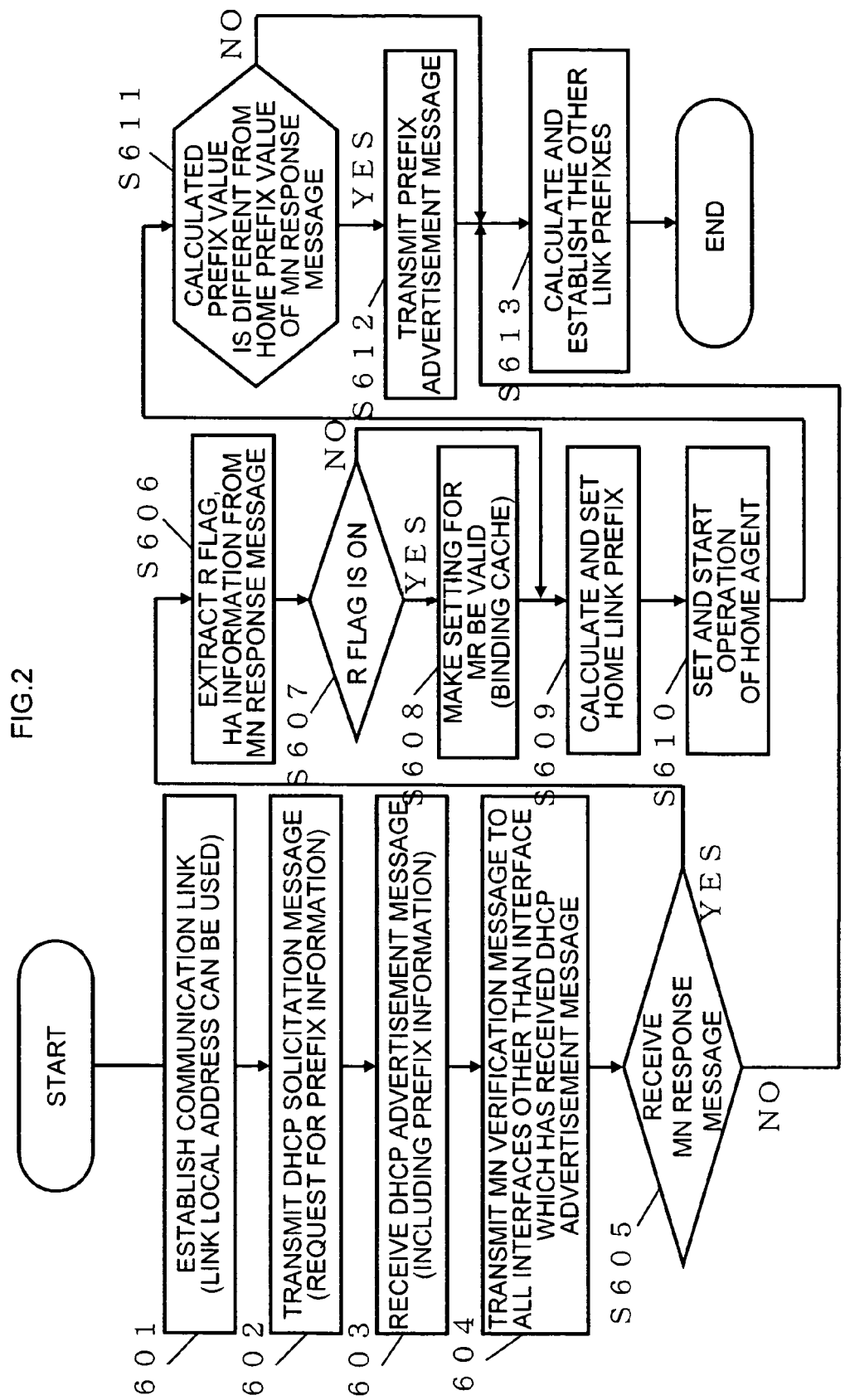
FIG. 2 is a flow chart showing an operation example of the home gateway device according to the embodiment of the invention.

Next, an operation when the home link is set at the time of activating or initializing the home gateway device 60 will be explained using a processing flow chart shown in FIG. 2. Hereupon, a processing in which the initialization unit 69 executes a setting of the home network 80 will be explained.

First, connections with all communication links 51 to 53 are established by an instruction of the initialization unit 69 and the validation of link local addresses is executed (S601).

Next, the network information processing unit 90 transmits a DHCP solicitation message 200 requesting prefix information to all the communication links through the L3 processing unit 64 and the L1/2 processing units 61 to 63 (S602). At this time, the L3 processing unit 64 makes a transmission with a DHCP server multicast address written on the destination address of an IP header 201.

Figure 6:
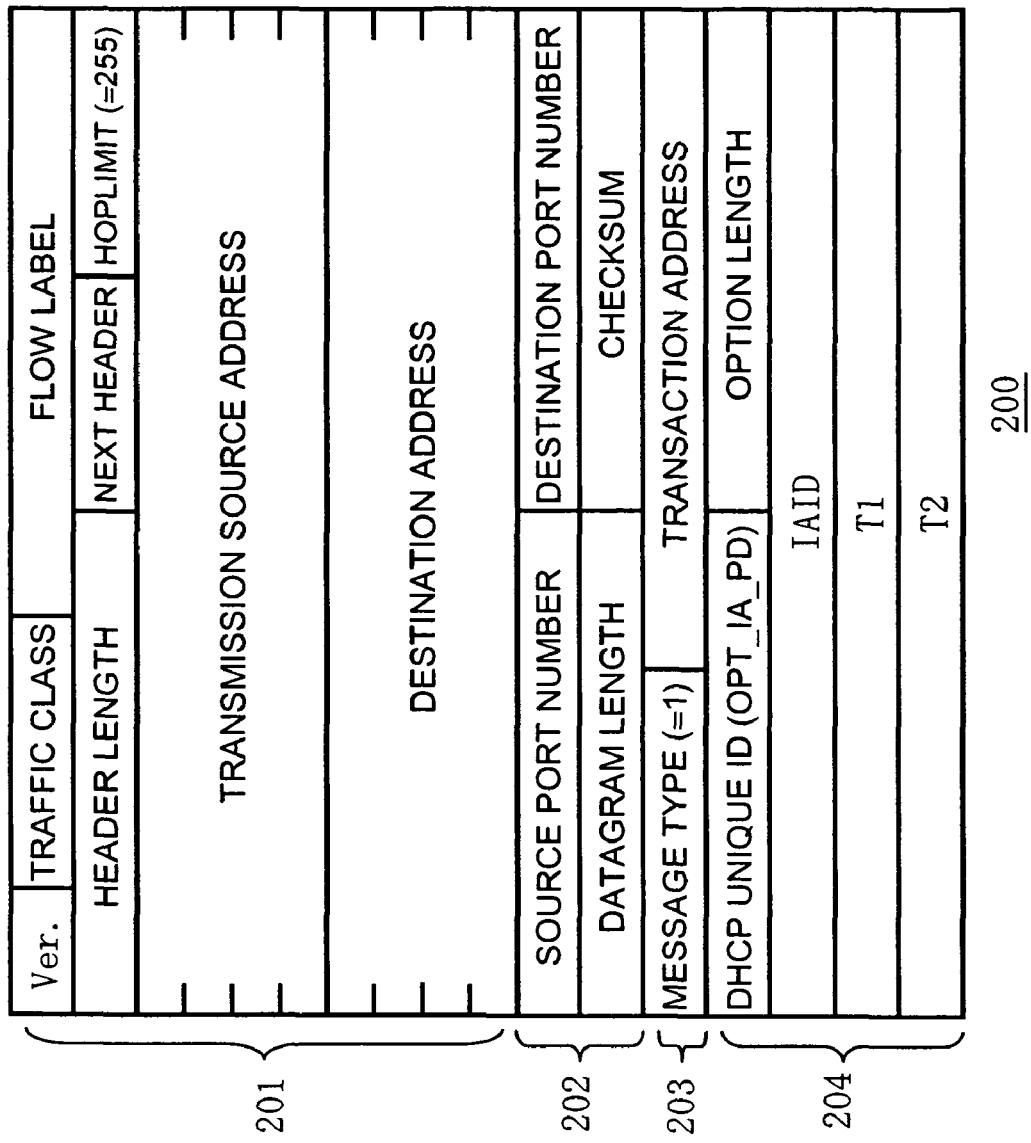
FIG. 6 is a chart showing a configuration of a DHCPv6 solicitation message according to the embodiment of the invention.

The DHCP solicitation message 200 is based on an IETF Internet draft "draft-ietf-dhc-dhcpv6 (Dynamic Host Configuration Protocol for IPv6) and an Internet draft "draft-ietf-dhc-dhcpv6-opt-prefix-delegation (IPv6 Prefix Options for DHCPv6), and a basic format thereof is shown in FIG. 6.

In FIG. 6, the DHCP solicitation message 200 includes an IP header 201, an UDP header 202, and a DHCP header 203, as well as an IA_PD option 204 for requesting the prefix information. Note that FIG. 6 shows nothing but the minimum format required in the invention, and message options other than the shown one can be added if required.

After that, the L1/2 processing units 61 to 63 receive a DHCP advertisement message 300 from any one of the communication links (S603).

The DHCP advertisement message is based on an IETF Internet draft "draft-ietf-dhc-dhcpv6 (Dynamic Host Configuration Protocol for IPv6) and an Internet draft "draft-ietf-dhc-dhcpv6-opt-prefix-delefation (IPv6 Prefix. Options for DHCPv6), and a basic format thereof is shown in FIG. 7.

Figure 7:
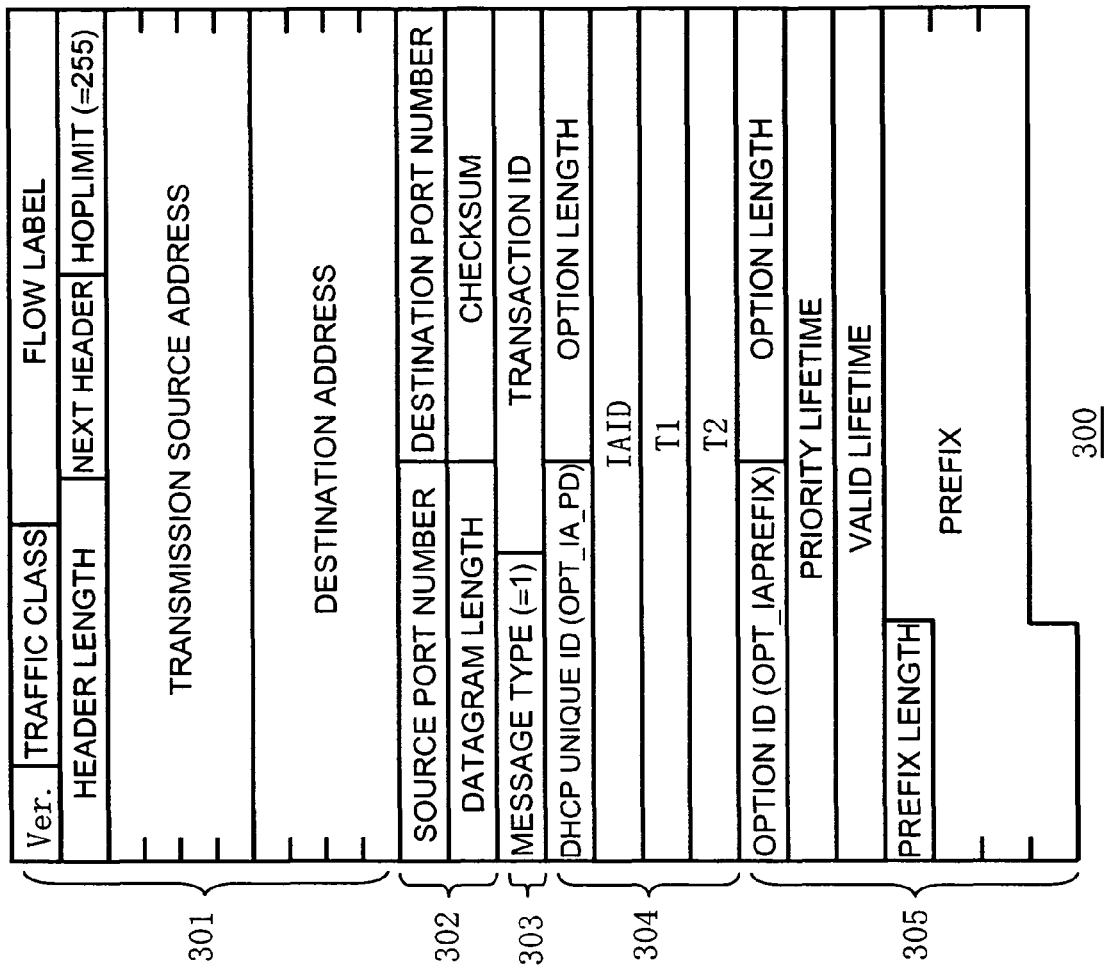
FIG. 7 is a chart showing a configuration of a DHCPv6 advertisement message according to the embodiment of the invention.

In FIG. 7, the DHCP advertisement message 300 includes an IP header 301, an UDP header 302, a DHCP header 303, and an IA_PD option 304, as well as an IA_PD prefix option 305 on which the prefix information is written. Note that FIG. 7 shows nothing but the minimum format required in the invention, and message options other than the shown ones can be added if required.

At this time, for example, the L1/2 processing unit 61 may receive the DHCP advertisement message 300 through the first communication link 51. In this case the L1/2 processing unit 61 forwards the DHCP advertisement message 300 to the L3 processing unit 64, and the L3 processing unit 64 further forwards it to the network information processing unit 90. The network processing unit 90 notifies the interface setting unit 67 of the acquired prefix information and information of the L1/2 processing unit 61 (for example, link ID) connected to the communication link 51 which has received the DHCP advertisement message 300. Upon receipt of the notice, the interface setting unit 67 makes the communication links other than the link to which the L1/2 processing unit 61 is connected home links (52 and 53 in this case). And further, the interface setting unit 67 derives prefixes to be assigned to the communication links 52, 53 and IP addresses to be assigned to the L1/2 processing units 62, 63, from the acquired prefix information, and sets these in the L3 processing unit 64. At this time, the interface setting unit 67 may manage types of the communication links using a link management table 100 as shown in FIG. 5, or may manage types of the communication links through the L3 processing unit 64 by adding an extension, listing the types of links, in a typical routing table managed by the L3 processing unit 64.

In the link management table 100 shown in FIG. 5, information concerning the IP address, the link layer address and the link type of the communication links 51 to 53 respectively is entered. For example, in an entry 101 concerning the communication link 51, the link type 104 is "ISP" indicating one to be connected to the ISP network 70, and in entries 102, 103 concerning the communication links 52, 53, the link type 104 is "Home" indicating home links.

The processing that notifies the interface setting unit 67 of the communication link which has received the DHCP advertisement message 300 may be executed by the L3 processing unit 64.

In the case that there is a possibility of receiving the DHCP advertisement message 300 from plural communication links, waiting time for acquiring the message from potential communication links can be provided.

At this time, the interface setting unit 67 performs a setting of the L3 processing unit 64 so that the L3 processing unit 64 transmits router advertisement messages 400 sent from that time to the communication links 52 and 53 which have been made the home links, by turning a home agent flag 403 on (S610). The interface setting unit 67 may complete the initialization by the above processing; however, it is preferable to execute the following procedures to select and set the home link more appropriately.

Figure 9:
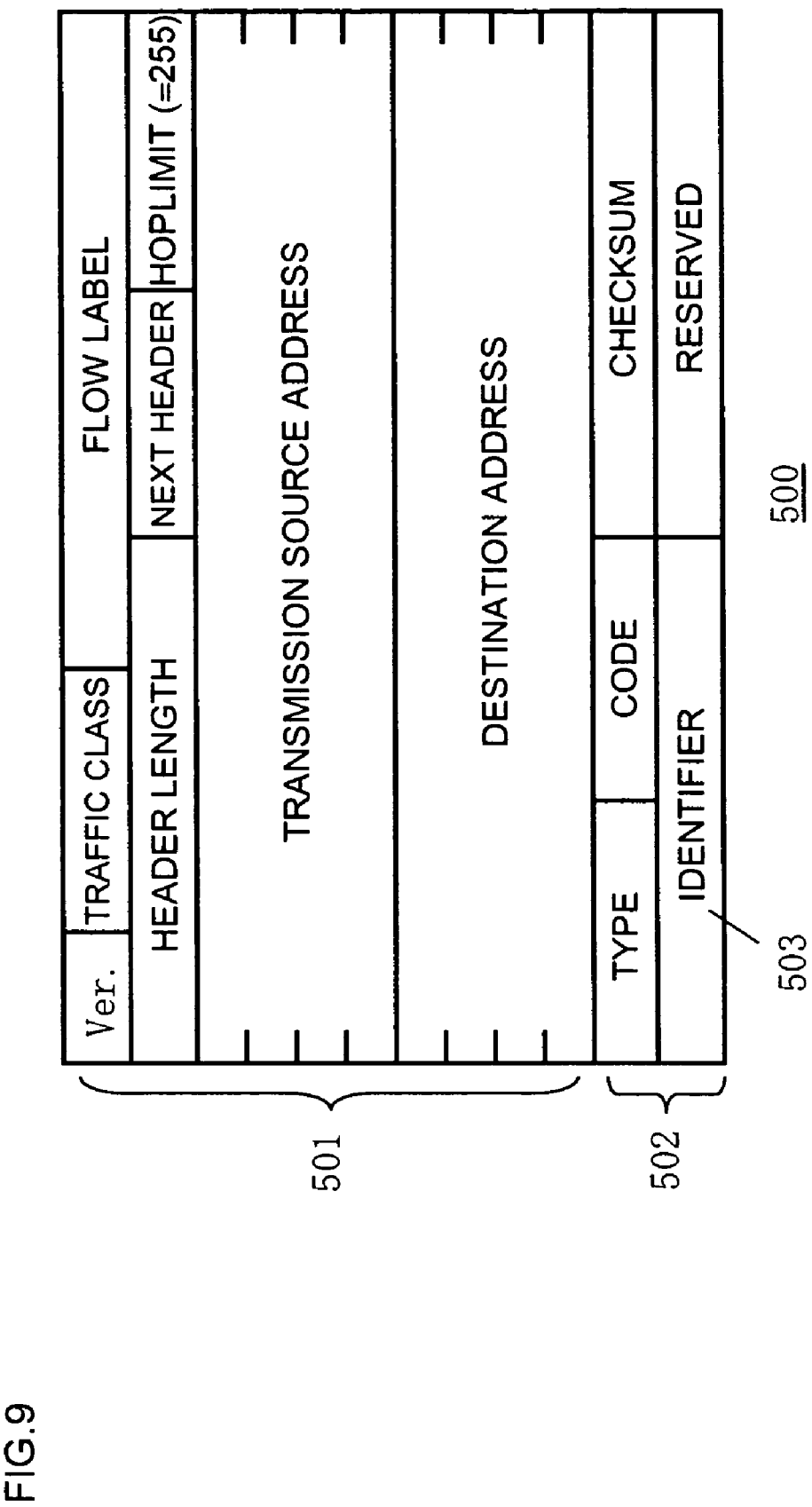
FIG. 9 is a chart showing a configuration of a mobile terminal verification message according to the embodiment of the invention.

Specifically, the interface setting unit 67 recognizes the communication links other than the communication link 51 which has received the DHCP advertisement message 300, namely, communication links 52 and 53, as home link candidates, and transmits a mobile terminal verification message 500 as shown in FIG. 9 to broadcast or all-nodes multicast to the communication links 52 and 53, through the L3 processing unit 64 and the L1/2 processing units 62, 63 connected to these communication links 52, 53 (S604).

In FIG. 9, the mobile terminal verification message 500 includes an IP header 501 and an ICMP MN verification message 502. In an identifier field 503, a unique identifier for identifying the present message is written.

Hereupon, if the terminals 10*a*, 10*b* connected to the communication links 52, 53 are a terminal based on the mobile IP (mobile terminal) and a terminal not based on the mobile IP (fixed terminal) respectively, both the mobile terminal 10*a* and the fixed terminal 10*b* receive the mobile terminal verification message 500. However, only the mobile terminal 10*a* responds to the message and transmits a mobile terminal response message 600 as shown in FIG. 10.

Figure 10:
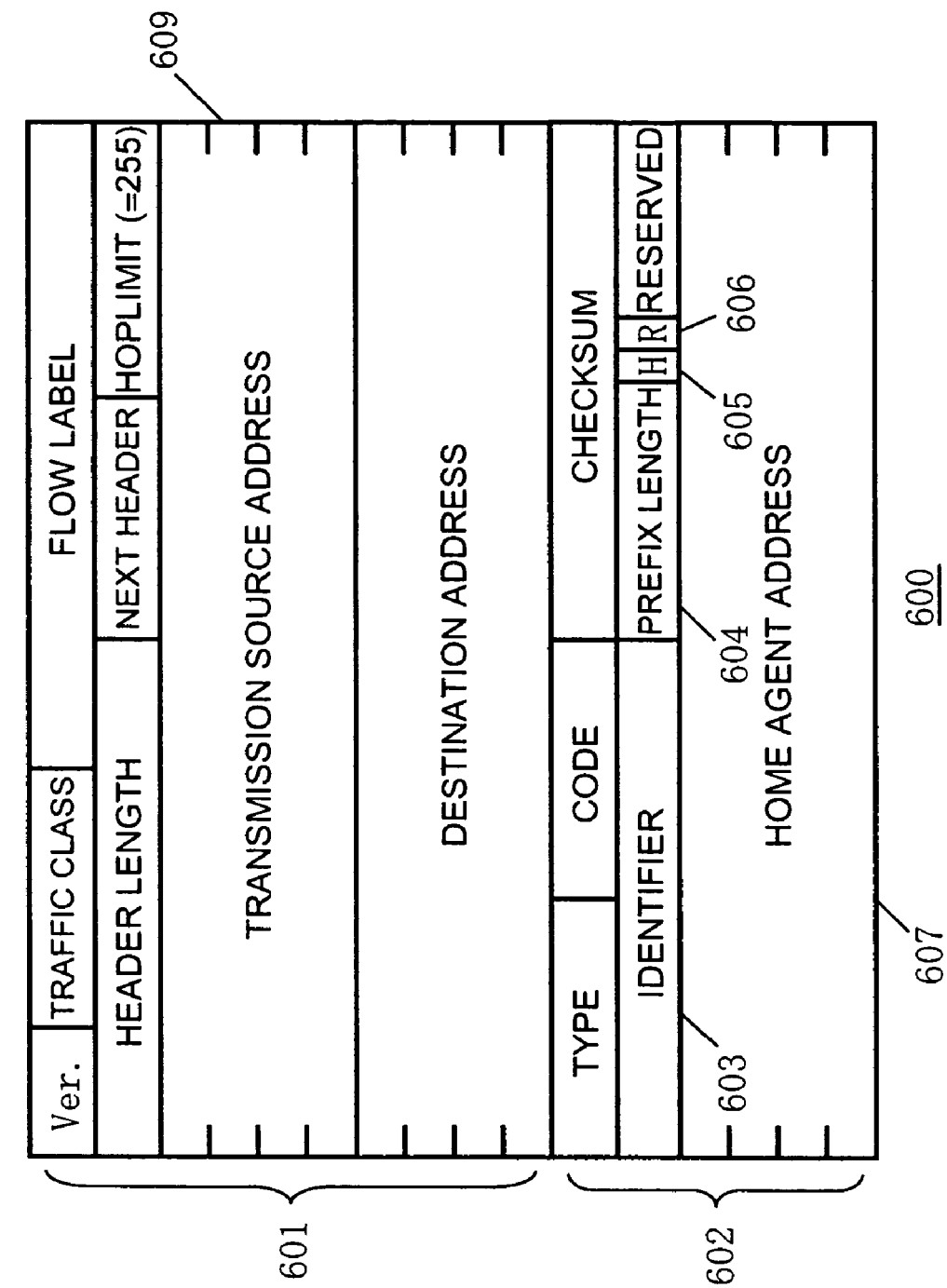
FIG. 10 is a chart showing a configuration of a mobile terminal response message according to the embodiment of the invention.

In FIG. 10, the mobile terminal response message 600 includes an IP header 601 and an ICMP MN response message 602. In an identifier field 603, the same value as in the identifier field 503 of the received mobile terminal verification message 500 is written. In a home agent address field 607, the address of the home agent stored by the mobile terminal at that time is written, and in a prefix length field 604, the prefix length of the home link is written. A home mode (H) flag 605 is set to '1' in the case of the state that the mobile terminal 10*a* is connected to the home link. A mobile router (R) flag 606 is set to '1' in the case that the mobile terminal operates as a mobile router.

The interface setting unit 67 receives the mobile terminal response message 600 transmitted by the mobile terminal 10*a* connected to the communication link 52 through the network information processing unit 90, the L3 processing unit 64 and the L1/2 processing unit 62, and determines the communication link 52 from which the message is received as the home link (S605). Namely, this time, the communication link 52 is determined to be the home link.

Next, after the interface setting unit 67 verifies that the value of the identifier field 603 in the mobile terminal response message 600 matches the value of the identifier field 503 in the mobile terminal verification message 500 previously transmitted, and verifies that the home mode flag (H) 605 is set to '1', values written in the home agent address field 607 and the prefix length field 604 and the value of the mobile router flag 606 in the mobile terminal response message 600 are extracted (S606). Note that the home mode flag (H) 605 shows that the mobile terminal is currently connected to the home link, and is set to '1' when the terminal is connected with a home link in the embodiment. The mobile router flag 606 shows that the mobile terminal operates as a mobile router, and is set to '1' when terminal operates as the mobile router in the embodiment.

Hereupon, when the mobile router flag 606 is set to '1' (S607), the interface setting unit 67 instructs the home agent setting unit 68 to provide a field for managing mobile prefixes accommodated in the mobile router in a binding cache according to a mobile router protocol. The home agent setting unit 68 updates the binding cache managed by the home agent processing unit 65 to be one in which this field is provided (S608).

Subsequently, the interface setting unit 67 calculates a home link prefix value from the value of the home agent address field 607 and the value of the prefix length field 604 previously extracted, and evaluates whether the prefix value can be derived from the prefix value previously acquired by using the DHCP advertisement message 300. That a link prefix value can be derived from an advertisement prefix value means that the advertisement prefix value is in the range of addresses which can be assigned on the link. When the value is evaluated to be able to be derived, the calculated prefix value and the address formed therefrom are set in the L1/2 processing unit 62 connected to the home link 52. When the value is evaluated to be not able to be derived, a prefix value calculated from the prefix value previously acquired by using the DHCP advertisement message 300 and the address formed therefrom are set in the L1/2 processing unit 62 connected to the home link 52 (S609).

Next, when the selection of the home link by the interface setting unit 67 is completed, the interface setting unit 67 notifies the home agent setting unit 68 of information of the L1/2 processing unit 62 connected to the home link (for example, a link ID), and the address of the home agent formed from the calculated home link prefix value and the home link prefix. The home agent setting unit 68 sets these values in the home agent processing unit 65 and starts the home agent processing. At the same time, the home agent setting unit 68 performs a setting for the L3 processing unit 64 so that the router advertisement message 400 with the home agent flag 405 set to '1' transmitted through the L1/2 processing unit 62 (S610). Consequently, when a router advertisement message 400 from another router is received, and in the case where the home agent flag 403 is on, the home agent processing unit 65 makes and manages a home agent list in accordance with a Mobile IP protocol and based on the added information. Since the home agent processing unit 65 can apply the operation only to the communication links set as the home links (in this case, the communication links 52), the processing burden can be made less than the case where the operation is applied to all the communication links 51 to 53. At the same time, the home agent setting unit 68 can set required information such as the home agent address and the home prefix in the home agent processing unit 65.

The information concerning the home link which is given to the home agent setting unit 68 and the home agent processing unit 65 will be sent based on the link management table 100 by the interface setting unit 67. Alternatively, the information can be sent by the interface setting unit 67 making reference to a routing table extended so as to manage the link types.

Figure 11:
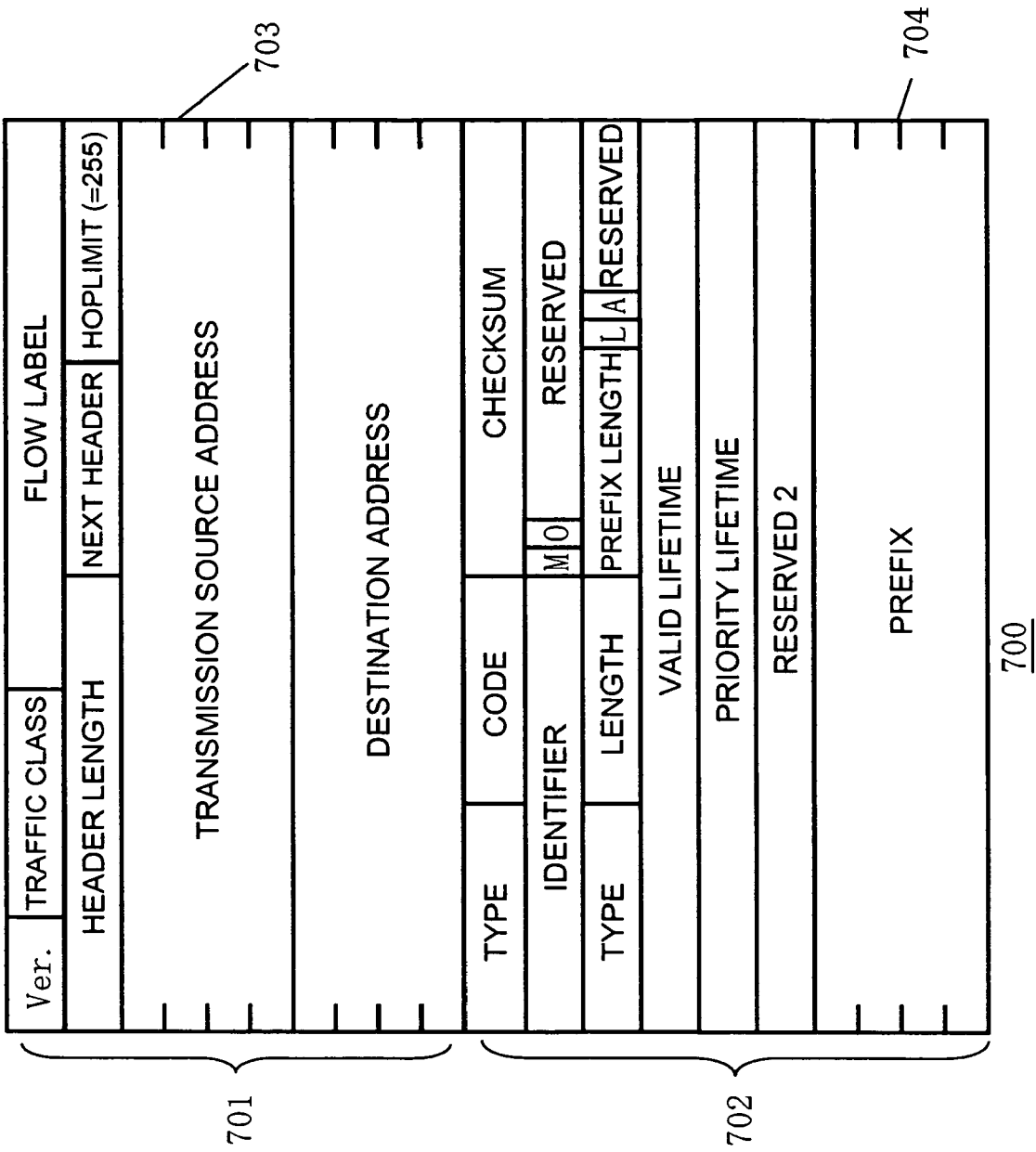
FIG. 11 is a chart showing a prefix advertisement message according to the embodiment of the invention.

Next, when the previously calculated home link prefix value is different from the prefix value acquired from the mobile terminal response message 600 (S611), that is, when the mobile IP setting of the mobile terminal 10a needs to be changed, the interface setting unit 67 transmits a prefix advertisement message 700 shown in FIG. 11 in order to notify the mobile terminal 10a of the change of the home link prefix (S612).

In FIG. 11, the prefix advertisement message 700 includes an IP header 701 and an ICMP mobile prefix advertisement message 702 prescribed by the mobile IP protocol. In a prefix field 704, a new home link prefix value is written, while in a source address field 703, the global address assigned by the home gateway device 60 to the communication interface connected to the home link 52, namely, the address of the home agent, is written.

Next, the interface setting unit 67 calculates the link prefix of the remaining communication link 53 from the prefix value previously acquired by using the DHCP advertisement message 300, and further sets the address formed based on the prefix in the L1/2 processing unit 63, thus completing the initializing processing.

Note that the mobile terminal verification message and the mobile terminal response message explained above are examples. Messages or procedures other than the shown formats can be applied as long as they achieve the same function.

In addition, other information of the L1/2 processing unit 61 which has received the DHCP advertisement message 300 with which the invention is not concerned may be processed by the interface setting unit 90 or else by the initialization unit 69.

Furthermore, when the L3 processing unit 64 executes authentication of a terminal using IPsec and makes an improvement of confidentiality of communication channels, the home agent setting unit 68 may set a security database prescribed by relevant RFCs such as RFC 2401 only for a communication link which does not belong to the home network (in this case, the communication link 51). Accordingly, the L3 processing unit 64 can apply IPsec to a communication channel other than the home network 80, and as a result, the processing burden can be reduced.

Next, a configuration and a basic operation of the mobile terminal 10 will be explained.

Figure 13:
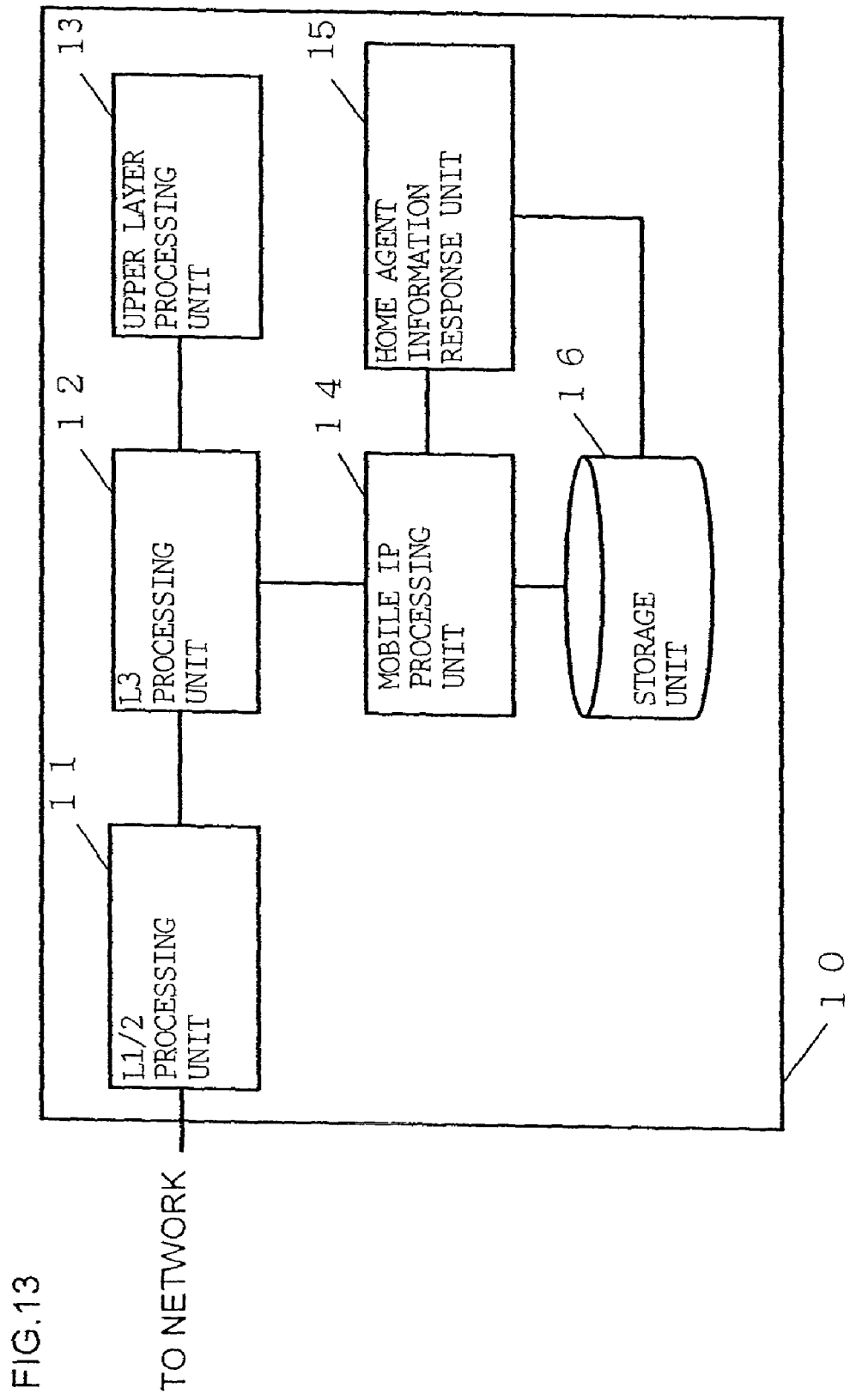
FIG. 13 is a diagram showing a configuration of a mobile terminal according to the embodiment of the invention.
Figure 14:
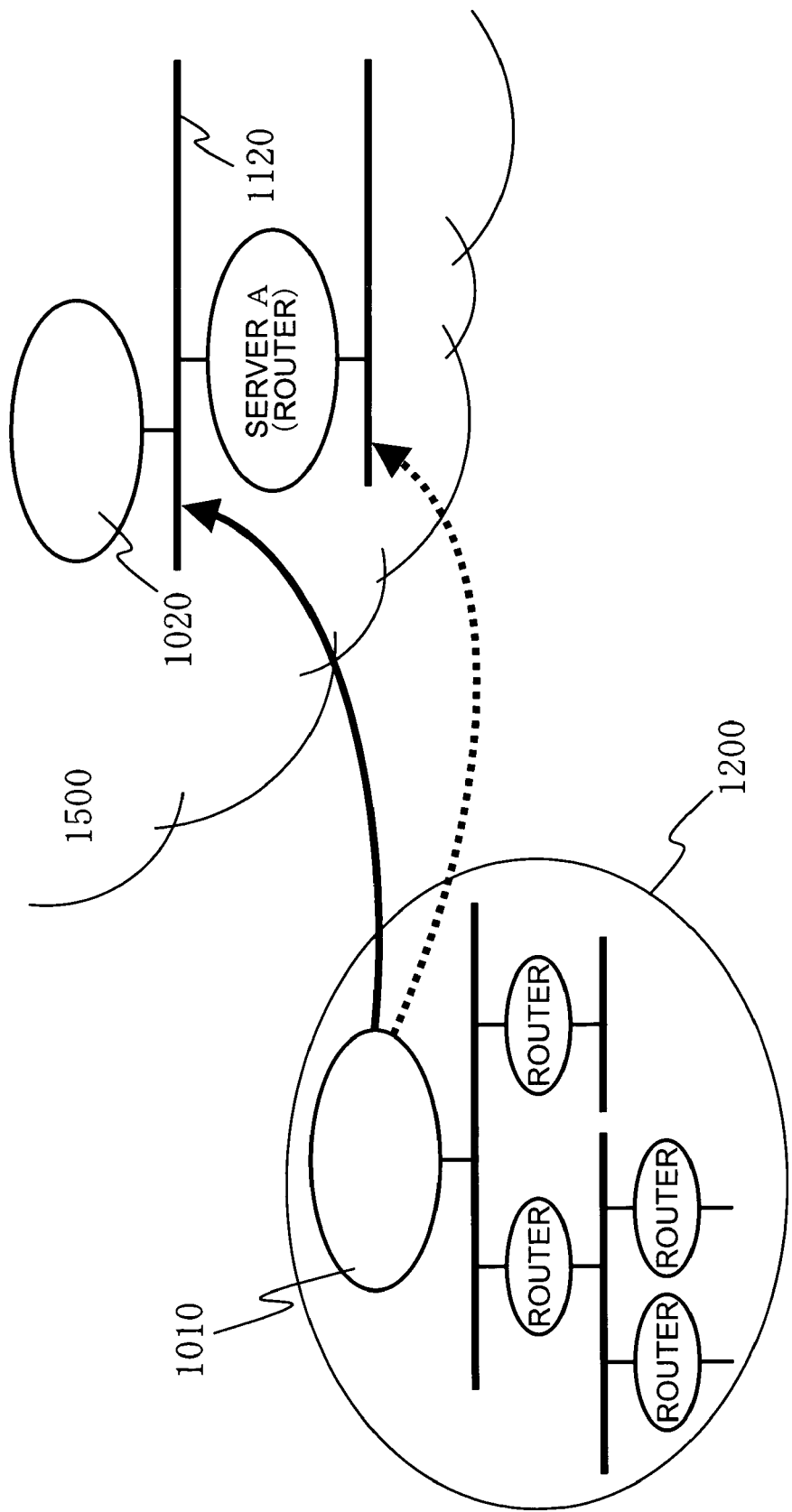
FIG. 14 is a view showing a configuration of a conventional mobile communication system.

FIG. 13 is a configuration diagram of the mobile terminal 10.

In FIG. 13, an L1/2 processing unit 11 is connected to a communication link, executing a physical layer processing and a data link layer processing, and an L3 processing unit 12 executes a network layer processing. An upper layer processing unit 13 performs a processing of a protocol or application which is higher than the network layer, and a mobile IP processing unit 14 performs a mobile IP processing. A home agent information response unit 15 makes the mobile terminal response message. A storage unit 16 stores information about a home agent to which that terminal is registered, or information about the mobile IP.

In FIG. 13, only one L1/2 processing unit 11 is shown, but it may be a configuration having further more L1/2 processing units, and the invention does not limit the number thereof. In the case of having two or more L1/2 units, the operation thereof can be achieved by a configuration or procedures similar to those explained as follows.

A basic operation of the mobile terminal 10 as configured above will be explained as follows.

First, when the mobile IP processing unit 14 receives the mobile terminal verification message 500 through the L1/2 processing unit 11 and the L3 processing unit 12, it instructs the home agent information response unit 15 to make the mobile terminal response message 600.

The home agent information response unit 15 writes the source address of the mobile terminal verification message 500 in the destination address field 609, and writes the same value as in the identifier field 503 of the mobile terminal verification message 500 in the identifier field 603. The home agent information response unit 15 also writes the address of the home agent stored in the storage unit 16 in the home agent address field 607, writes the home link prefix length in the prefix length field 604, writes '1' in the home mode flag 605 when the mobile terminal is currently connected to the home link, and writing '1' in the mobile router flag 606 when the mobile terminal 10 operates as a mobile router. The entries in the other fields are made in the conventional way.

Next, the mobile IP processing unit 14 transmits the completed mobile terminal response message 600 through the L3 processing unit 12 and the L1/2 processing unit 11.

Subsequently, when the mobile IP processing unit 14 receives the prefix advertisement message 700, it extracts the address of the home agent from the transmission origin address field 703 and extracts the home link prefix value from the prefix field 704, and then updates the setting of information on the mobile IP stored in the storage unit 16.

Next, a setting method of the home link in the mobile communication system comprising the above home gateway device and the mobile terminals will be explained as follows.

Figure 4:
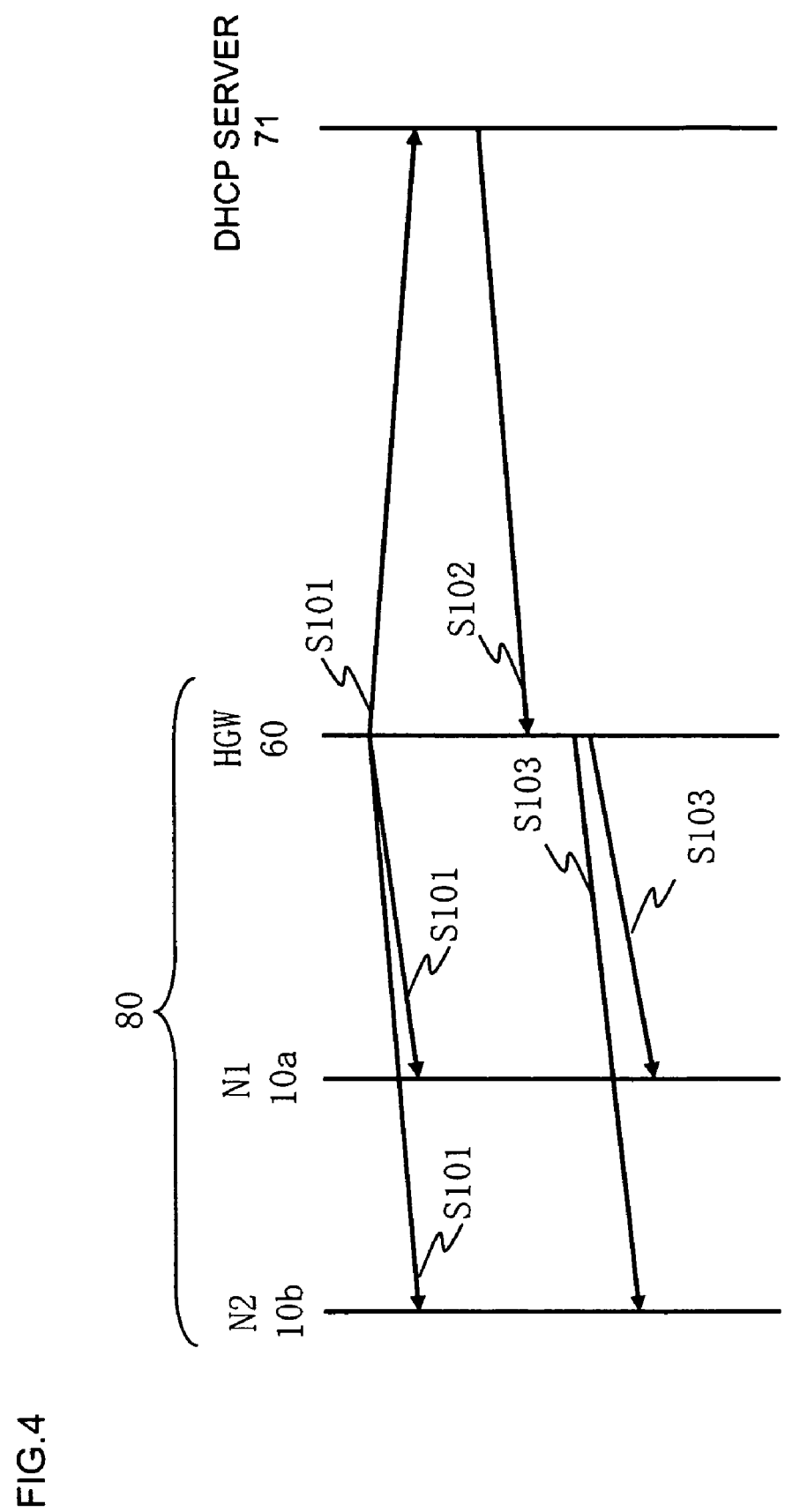
FIG. 4 is a sequence diagram showing a home link setting method according to the embodiment of the invention.

FIG. 4 is a view showing a communication message flow in the mobile communication system according to the invention.

First, the home gateway device (HGW) 60 transmits the DHCP solicitation message 200 to all the communication links 51, 52 and 53 in order to acquire network information for setting the home network (step S101).

In the case of FIG. 3, only a DHCP server 71 can make a response to the DHCP solicitation message 200. Therefore, the DHCP server 71 transmits to the home gateway device 60 the DHCP advertisement message 300 in which is written the prefix information allocated to the home gateway device 60

(step S102). The terminal (N1) 10*a* and the terminal (N2) 10*b* do not respond to the DHCP solicitation message 200. Strictly speaking, since the DHCP solicitation message 200 is transmitted to the multicast address of the DHCP server, the terminals 10*a*, 10*b* not having a DHCP server function cannot receive the DHCP solicitation message 200.

Next, the home gateway device 60 which has received the DHCP advertisement message 300 executes a standard setting of the home network 80 based on the prefix information written in the IA-PD prefix option 305. Namely, among the acquired prefix values, the device derives lower prefix values and sets them to the communication links 52, 53. And further, the home gateway device 60 performs processing such as preparation for transmitting the router advertisement message 400 for advertising the prefix information of the communication links 52, 53, construction of the routing table, and operation start of a routing protocol.

The home gateway device 60 also executes a setting for the home agent at the same time. Namely, the home gateway device 60 designates the communication links 52, 53 other than the communication link 51 which previously received the DHCP advertisement message 300 as home links, and makes a management so as to distinguish them from the other communication link 51 after that. Once the communication links 52, 53 are designated as the home links, the home gateway device 60 subsequently transmits the router advertisement message 400 transmitted to the communication links 52, 53 by turning the home agent flag 403 on (step S103). Accordingly, the terminal 10 which can execute the mobile IP protocol can identify the home gateway device 60 as a home agent in accordance with procedures of the conventional mobile IP when it receives a router advertisement message 400 with the home agent flag 403 on. Specifically, the terminals 10*a*, 10*b* set their home agent information to be that provided by the home gateway device 60 in accordance with procedures of the mobile IP. Consequently, when they move to an foreign network connected to Internet 1, they can receive packets destined to themselves without re-writing the address field of the original packets if they transmit a binding update message to the home gateway device 60 in accordance with the procedures of the mobile IP. As a result, the migration transparency can be achieved.

In the above embodiment, the communication links to be set as the home links are all of the communication links, other than the communication link which has received the DHCP advertisement message. However, other settings are acceptable as long as at least one communication link is set as a home link. For example, the communication link having the smallest link ID value (communication link 52 in FIG. 5) may be set as the home link.

In this case, in the link management table 100 of FIG. 5, the link type of the entry 101 is "ISP", the link type of the entry 102 is "Home", and the link type of the entry 103 is "Normal" showing that it is a normal communication link. Accordingly, the home gateway device 60 regards the communication links other than the communication link 52 which are home links as foreign links, and turns off the home agent flag 403 of the router advertisement message 400 transmitted to the foreign links. When the terminal 10*a* departs from the communication link 52 and is connected to the communication link 53, a binding update is made to the home gateway device 60 in accordance with the mobile IP procedures.

Figure 12:
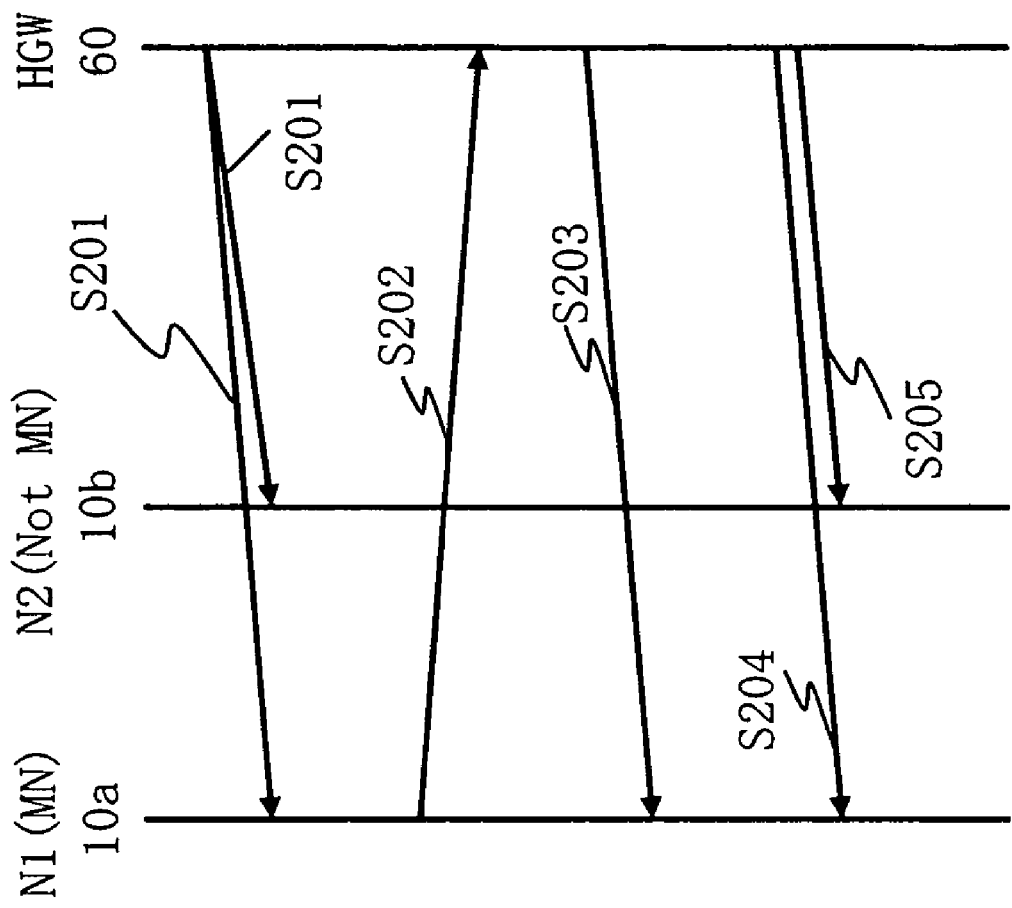
FIG. 12 is a sequence diagram showing a home link setting method according to the embodiment of the invention.

Furthermore, a method of selecting an more appropriate home link among plural communication links will be explained with reference to FIG. 12.

First, when the home link candidates, namely, the communication links other than the communication link 51 which previously received the DHCP advertisement message 300 are detected (communication links 52, 53), the home gateway device 60 recognizes them as the home link candidates. Then, the device transmits the mobile terminal verification message 500 as shown in FIG. 9 to all the terminals on these communication links 52, 53 (S201).

Here, if the terminals 10*a*, 10*b* connected to the communication links 52, 53 are a terminal based on the mobile IP (mobile terminal) and a terminal not based on the mobile IP (fixed terminal) respectively, when both the mobile terminal 10*a* and the fixed terminal 10*b* receive the mobile terminal verification message 500, only the mobile terminal 10*a* responds to that and transmits the mobile terminal response message 600, and the fixed terminal 10*b* does not transmit the mobile terminal response message 600 (S202). Additionally, when the mobile terminal 10*a* based on the mobile IP does not operate the mobile IP protocol, the terminal does not respond to the mobile terminal verification message 500 if received. Still further, even when the mobile terminal 10*a* based on the mobile IP operates the mobile IP protocol, it may be configured so that the mobile terminal response message 600 is generated and transmitted only in the case the terminal is connected to the home link.

The home gateway device 60 identifies the communication link which has received the mobile terminal response message 600 and sets it as the home link.

Then, the home gateway device 60 determines the home link prefix based on the received mobile terminal response message 600, and sets the communication interface connected to the home link. When notice of the change of the home link prefix is given to the mobile terminal 10*a*, the prefix advertisement message 700 is transmitted (S203).

Next, when the mobile terminal 10*a* receives the prefix advertisement message 700, it updates the setting of the mobile IP based on the message.

Next, the home gateway device 60 transmits the router advertisement message 400 in which the home agent flag 403 is set to '1' to the home link 52 (S204), and transmits the router advertisement message 400 in which the home agent flag 403 is cleared to '0' to the other communication link 53 (S205).

After the setting of the home link is completed, the home gateway device 60 executes the standard operation concerning the home agent only to the communication links 52. For example, when the home agent flag 405 of the router advertisement message 400 from another router received through the communication links 52 is on, the device makes and manages the home agent list based on information written in the message. In the mobile IP, since this processing is an option, it is not always carried out. Note that methods of making and managing the home agent list are prescribed in the mobile IP protocol.

In the case of executing the authentication of a terminal using IPsec and improving confidentiality of channels, and when the IPsec is applied only to the channels other than the home network 80 in order to reduce the burden of the home gateway device 60, a security database prescribed by relevant RFCs such as RFC 2401 need be set only for the communication link (in this case, the communication link 51) which does not belong to the home network.

When the setting of the home prefix assigned to the home agent address or the home link is performed, corresponding processing required for the home agent, for example, the initialization of the binding cache and the like can be executed. In the case that the mobile router flag 606 of the mobile terminal response message 600 previously received is set to '1', the binding cache is prepared, in which a field for managing the mobile prefixes accommodated in the mobile router according to the mobile router protocol is provided.

In the embodiment, "DHCP" was explained as an example of an IETF standard protocol for acquiring network information, but the invention is not limited to this. Specifically, the home link setting method and the home gateway device according to the invention specifies the communication link which was able to acquire the home network information, and then sets a communication link other than that one as the home link. Therefore, when the home network information is acquired by using protocols other than DHCP, the invention can be carried out in the same way as the embodiment as long as the message to be acquired has a form receivable through any one of the communication links.

As described above, by setting the communication link to which the mobile terminal based on the mobile IP is connected as the home link, the home agent function included in the home gateway device can be effectively utilized.

In addition, the home gateway device according to the invention, in the step S203, can immediately notify the mobile terminal of the change of the home link information by means of the prefix advertisement message 700. Accordingly, the mobile terminal can immediately acquire the right home agent as well as the home link information, and can notify the home agent of the registration, and therefore the loss of packets can be prevented at all times.

If the invention is not employed, the mobile terminal 10a needs to detect the change of the home link prefix from the link prefix value written in the prefix option added to the router advertisement message 400 received later, and needs to operate a Dynamic Home Agent Discovery protocol and a Mobile Prefix Discovery protocol in accordance with the mobile IP procedures to acquire the changed home link prefix. This requires long processing time. Consequently, in the case that the mobile terminal is cut from the link and moves to an external link while processing is being carried out, it can not acquire the right home agent and the home link information, and in particular received packets destined to the home address of the mobile terminal are not forwarded and are lost.

As described above, according to the invention, the home gateway device selects the communication interfaces other than the one which acquired the network information for setting the home network to be the home links, and executes settings of the home link and the home agent appropriately by using the acquired network information. Accordingly, the home gateway device can achieve automatization of these settings. Further, according to the invention, the home gateway device can select links to which the mobile terminals based on the mobile IP are connected as their home link, and can acquire and set the existing home agent information from the mobile terminals, and therefore the setting of the home links can be carried out without compelling the mobile terminals to change the setting.

Additionally, communication links other than the communication link which was able to acquire the home network information is set as the home links so that security can be maintained, for example, when connecting to an Internet service provider (ISP) to acquire the network information.

Furthermore, in the home gateway device performing plural physical connections to different ISPs, achieving a multi-home environment obtaining information form various different networks in order to make an improvement of the communication range or provide a back-up line, an communication interface not connecting to the ISP can be automatically selected from among the plural communication interfaces (physically speaking, the connection ports), therefore, troubles due to human errors can be prevented.

INDUSTRIAL APPLICABILITY

The invention is useful for a home gateway device and the like having a home agent function, and suitable for automatically performing settings of a home link and a home agent.

The invention claimed is:

1. A home link setting method at a start time of activating or a time of initializing a home gateway device for accommodating a mobile terminal in a home link, the home gateway device being connected to the mobile terminal via a communication link, the method comprising:
   transmitting, by the home gateway device, a solicitation message requesting network information used for setting a home network accommodating the mobile terminal to a plurality of connected communication links, the plurality of the connected communication links being already connected at the start time of activating or at the time of initializing the home gateway device;
   receiving, by the home gateway device, an advertisement message including the network information from at least one of the plurality of the connected communication links to which the solicitation message has been sent;
   selecting, by the home gateway device, a communication link to connect as the home link from among the plurality of the connected communication links other than the at least one of the plurality of connected communication links from which the advertisement message has been received; and
   executing, by the home gateway device, an internal setting so as to conduct a home agent function with respect to the mobile terminal on the selected communication link.

2. The home link setting method according to claim 1, wherein in said selecting of the communication link, a respective communication link to which the mobile terminal complying with a mobile IP protocol is connected is designated as the home link.

3. The home link setting method according to claim 2, wherein the mobile terminal is connected to the respective communication link connecting to a communication interface,
   wherein in said execution of the internal setting, when home agent information meets conditions specified by the network information, the internal setting is executed using acquired home agent information, whereas when the home agent information does not meet the conditions, the internal setting is executed using home agent information generated based on the network information.

4. The home link setting method according to claim 3, wherein in said execution of the internal setting, when the internal setting is executed using the home agent information which is newly generated, a notification of the newly generated home agent information is given to all mobile terminals on the home link.

5. The home link setting method according to claim 3, further comprising:
   acquiring information concerning a mobile router function stored in the mobile terminal,
   wherein when the mobile terminal performs a mobile router operation, a setting of a home agent corresponding to the mobile router is executed.

6. A home gateway device for accommodating a mobile terminal in a home link, the home gateway device connected to the mobile terminal via a communication link, comprising:
   plural communication links connected to an Internet network or a local link, the plural connected communication links being already connected at a start time of activating or at a time of initializing the home gateway device;

a network information processing unit transmitting a solicitation message requesting network information used for setting a home network accommodating the mobile terminal to the plural connected communication links and receiving an advertisement message including the network information from at least one of the plural connected communication links to which the solicitation message has been sent;

an interface setting unit selecting a communication link to connect as the home link from among the plural connected communication links other than the at least one of the plural connected communication links from which the advertisement message has been received;

a home agent processing unit performing a home agent function with respect to the mobile terminal on the selected communication link; and a home agent setting unit executing settings at the start time of activating or the time of initializing the home gateway device in said home agent processing unit so as to conduct the home agent function with respect to the mobile terminal on the selected communication link.

7. The home gateway device according to claim 6, wherein said interface setting unit transmits a verification message for verifying an existence of the mobile terminal complying with a mobile IP, and designates a respective communication link which has received a message responding to the verification message notifying the existence of the mobile terminal, as the home link.

8. The home gateway device according to claim 7, wherein said interface setting unit acquires home agent information stored in one of a plurality of mobile terminals connected to the home link, and wherein when the home agent information meets conditions specified by the network information, said home agent setting unit performs a setting of the home agent function using the acquired home agent information, whereas when the home agent information does not meet the conditions, said interface setting unit generates home agent information based on the network information and said home agent setting unit performs a setting of said home agent processing unit using the generated home agent information.

9. The home gateway device according to claim 8, wherein when said interface setting unit newly generates the home agent information, said home agent setting unit notifies all of the terminals on the home link of the new home agent information.

10. The home gateway device according to claim 8, wherein said interface setting unit further acquires information concerning a mobile router function stored in the mobile terminal, and wherein when the mobile terminal performs a mobile router operation, said home agent setting unit executes a setting corresponding to the mobile router in said home agent processing unit.

11. The home link setting method according to claim 4, further comprising:

acquiring information concerning a mobile router function stored in the mobile terminal, wherein when the mobile terminal performs a mobile router operation, a setting of the home agent corresponding to the mobile router is executed.

12. The home gateway device according to claim 9, wherein said interface setting unit further acquires information concerning a mobile router function stored in the mobile terminal, and wherein when the mobile terminal performs a mobile router operation, said home agent setting unit executes a setting corresponding to the mobile router in said home agent processing unit.

13. A home link setting method at a start time of activating or a time of initializing a home gateway device for accommodating a mobile terminal in a home link, the home gateway device being connected to the mobile terminal via a communication link, comprising:

transmitting, by the home gateway device, a solicitation message requesting network information used for setting a home network accommodating the mobile terminal to a plurality of connected communication links, the plurality of the connected communication links being already connected at the start time of activating or at the time of initializing the home gateway device;

receiving, by the home gateway device, an advertisement message including the network information for setting the home network from at least one of the plurality of the connected communication links to which the solicitation message has been sent;

selecting, by the home gateway device, a communication link to connect as the home link from among the plurality of the connected communication links other than the at least one of the plurality of the connected communication links from which the advertisement message has been received; and executing, by the home gateway device, a setting for conducting a home agent function with respect to the mobile terminal on the selected communication link, selecting, by the home gateway device, one of: (1) a first mode of operation in which the mobile terminal on the selected communication link uses home agent information stored in the mobile terminal for conducting the home agent function or (2) a second mode of operation in which the mobile terminal on the selected communication link uses other home agent information for conducting the home agent function, the other home agent information being based on the received network information, wherein the step of executing the setting causes the mobile terminal on the selected communication link to conduct the home agent function in accordance with the selected first or second mode of operation.

* * * * *